May 8, 1951 G. C. SZIKLAI 2,552,070

COLOR TELEVISION CAMERA

Filed June 2, 1947 2 Sheets-Sheet 1

INVENTOR.
GEORGE C. SZIKLAI
BY Samuel B. Smith
ATTORNEY

May 8, 1951 G. C. SZIKLAI 2,552,070

COLOR TELEVISION CAMERA

Filed June 2, 1947 2 Sheets-Sheet 2

INVENTOR.
GEORGE C. SZIKLAI
BY Samuel B. Smith
ATTORNEY

Patented May 8, 1951

2,552,070

UNITED STATES PATENT OFFICE 2,552,070

COLOR TELEVISION CAMERA

George C. Sziklai, Princeton, N. J., assignor to Radio Corporation of America, a corporation of Delaware Application June 2, 1947, Serial No. 751,808

17 Claims. (Cl. 178—5.4)

This invention relates to television image pickup devices and more particularly to a color television camera for the simultaneous type multicolor system.

It is well known that the transmission of images by electricity can be accomplished by analyzing the image into its image elements and deriving therefrom a signal train of impulses by a predetermined orderly sequence of scanning. The image may then be reproduced at a remote location by the same sequence of scanning.

It is also well known to the optical art that the reproduction of images in color may be accomplished by additive methods, that is, by breaking down the light from an object into a predetermined number of selected primary or component colors which are three in number for a tricolor system, or, for a compromised degree of fidelity of color representation, even a bicolor system might be employed.

Color images may, therefore, be transmitted by electricity by analyzing the light from the object into not only its image elements, but by also analyzing the light from elemental areas of the object into selected primary or component colors and deriving therefrom a signal train of impulses representative of each of the selected component colors. A color image may then be reproduced at a remote point by appropriate reconstruction from the component color signal trains.

The transmission and reproduction of color images may be accomplished by either of two fundamental systems of multiple image transmission which have become widely known as the sequential and the simultaneous systems of color image transmission.

The sequential system transmits at any one time only one component color signal train and transmits a portion of each of the selected component color signal trains in predetermined sequence with other selected component color signal trains and preferably at a rapidly recurring rate.

The simultaneous system transmits all component color signal trains simultaneously through three separate signal channels.

The device employed for converting light from an object into a signal train is commonly known as a television camera. In the transmission of images by the sequential system, the camera may have a single image pickup tube, such as, for example, the so-called image orthicon, which is exposed in succession to images giving color separation corresponding to the various selected component colors. During the period that the camera tube is exposed to each color component image, the mosaic is concurrently scanned to enable the transmission of signals representing the corresponding color separation image.

Image pickup tubes may take various forms. An image orthicon camera is shown and described in an article entitled "Image Orthicon Camera" by R. D. Kell and G. C. Sziklai in the "RCA Review" for March, 1946.

In the conventional sequential multicolor television receiver, a kinescope or other image producing tube is employed to recreate a black and white image likeness which is viewed or projected through a color filter of the selected component color corresponding to the desired component color instantaneously being represented. The process is then repeated for the next selected color component, and so on. A typical sequential color television system is shown and described in an article entitled "An Experimental Color Television System" by R. D. Kell, G. L. Fredendall, A. C. Schroeder, and R. C. Webb, beginning on page 141 of the "RCA Review" for June, 1946.

Although color images have been reproduced by the aforementioned sequential method, there are certain fundamental difficulties involved which tend to reduce the entertainment value of the sequential system. Typical difficulties involved include color action fringes resulting from movement between individual component color scannings and inadequacy of illumination which results from the required division of the available light for the reproduction in a sequential manner of the individual selected color component images.

The fundamental difficulties referred to above and others are eliminated in the popular simultaneous type of image transmission.

A simultaneous all-electronic color television system has been proposed involving a cathode ray scanning tube which forms a scanning raster to be projected on a color film from which selected component color light sensitive devices transform the resultant light into several separate signal trains, each representative of a selected component color. A system of this nature is sometimes referred to as the flying spot system, and is shown and described in an article entitled "Simultaneous All-Electronic Color Television," beginning on page 459 of the "RCA Review" for December, 1946. An improved color camera is shown and described in the co-pending U. S. application of Ray D. Kell and George C. Sziklai, Serial No. 716,256, filed December 14, 1946.

It will be seen, however, that the flying spot arrangement, which is very satisfactory for the conversion of planar color images to appropriate signal trains, is not readily adaptable to studio pickup requirements where the object is three-dimensional, and particularly when illumination is required at the position of the object for reading and the like, or when the scene to be transmitted includes important light sources.

There has also been proposed the employment of a color camera utilizing three complete and independent camera tubes, each of which separates from the light of the object being scanned a different selected component color image. Although satisfactory results can be obtained from such a system, disadvantages, including unusual bulk, expense, and difficulty in registration, at once become apparent.

Such difficulties, and particularly registration problems, can be largely eliminated by the employment of only a single scanning raster. In order to utilize a single scanning raster for the development of the simultaneous type of color television signal trains, it is necessary to provide for the break-down of light into its selected component colors by substantially simultaneous action of the scanning raster on the object or image thereof to obtain individual signal trains representative of each of the selected component colors.

According to this invention, a single scanning raster is employed to break the light from the object into separate signal trains representative of similar sequences of scanning of the object in each of its selected component colors. Each elemental area of the image of the object is broken down, in the case of a three-component color system, into three sub-elemental areas, each sub-elemental area representative of one of the selected component colors. The signal impulses resulting from a scanning of the sub-elemental areas are then isolated in accordance with their respective component color representation and transmitted simultaneously after a process of integration.

A primary object of this invention is therefore to provide an improved color television system.

Another object of this invention is to provide an improved simultaneous type color television camera free from registration problems.

Other and incidental objects of the invention will be apparent to those skilled in the art from a reading of the following specification and an inspection of the accompanying drawing in which Figure 1 illustrates by block diagram one typical form of this invention;

Figure 1:
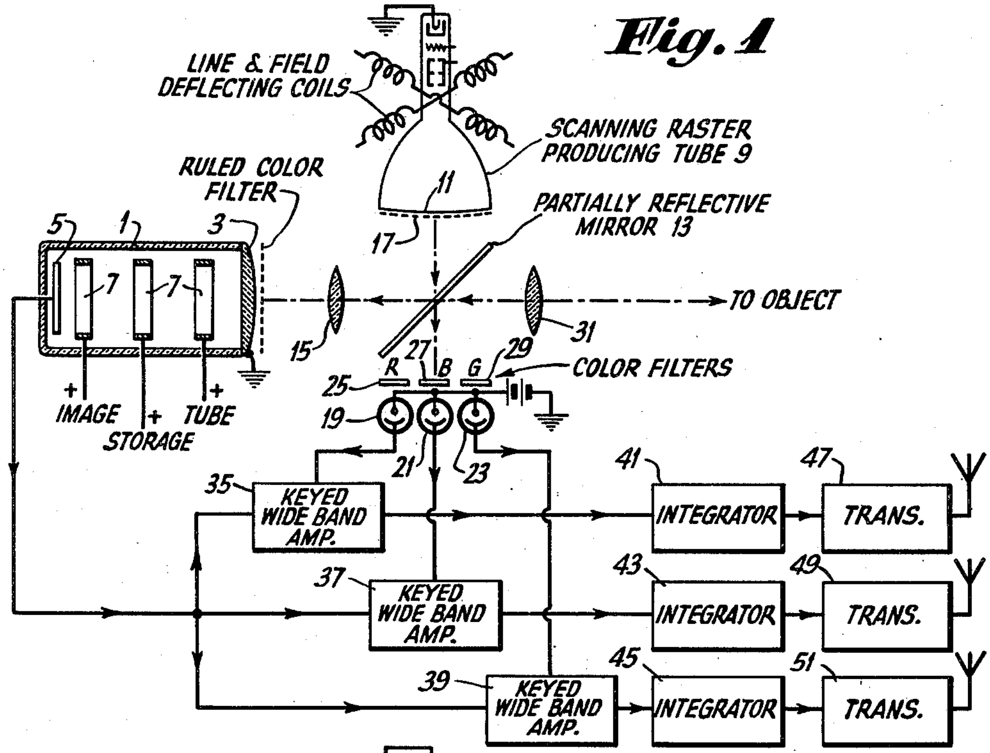

Turning now in more detail to Figure 1, there is shown an image storage tube 1 having a photo cathode 3 and an associated electron image storage electrode 5. The operation of the image storage tube 1 is somewhat analogous to the operation of the image tube.

The image tube is known to the art and here needs no detailed explanation, except perhaps to outline the fundamental principles upon which its operation depends in order that the invention herein disclosed may be more readily understood.

The operation of an image tube has been outlined in detail beginning on page 385 of the "RCA Review" for September, 1946. The image tube consists of a photo cathode, a fluorescent screen and an electron lens system contained in an evacuated glass envelope. When an image is focused on its photo cathode, electrons are emitted from it with a density distribution which corresponds to the distribution of illumination on the photo cathode. These electrons are accelerated and focused by an electron lens into an image which impinges upon the associated fluorescent screen. Here the energy contained in the speed of the electrons is converted into visible light, thus reproducing the image focused on the photo cathode.

By substituting a mosaic electrode 5 for the fluorescent screen of the image tube, an electron image will be formed on the mosaic electrode due to the bombardment by the electrons emitted from the photo cathode. Such action is also well known to the art, as well as the advantages to be gained by employing secondary electron emission and image storage action.

High degrees of sensitivity for lower light levels and great depths of focus can be obtained by the use of secondary-emission image intensification, that is, producing by secondary emission as a result of electronic bombardment an electron image instead of an ordinary light image. Such electronic action has been employed to increase the sensitivity of the iconoscope, as is described in detail by Harley Iams, G. A. Morton and V. K. Zworykin in an article entitled "The Image Iconoscope," beginning on page 541 of the "Proceedings of the Institute of Radio Engineers" for September, 1939.

From a brief study of the theory of operation of the image tube, it will be seen that an electron image will be projected on the mosaic electrode 5 from the optical image positioned on the photo cathode 3. This action is accomplished in the case of the image tube 1 by an electron lens system involving, for example, an electrostatic lens 7 which focuses the electron image generated at the photo cathode 3 on the mosaic electrode 5. The photo cathode 3 is semi-transparent so that the light image can be projected on the right side while the electrons are emitted from the left side of the photo cathode 3.

The electron lens system involving the cylindrical electrodes 7 is so arranged in the tube 1 that it causes a strong field to draw the electrons away from the photo cathode 3 in order that the photo emission of the cathode 3 may be completely saturated.

The electron-lens system, although shown in the electrostatic form, may comprise an inductance coil, as is known to the art.

When an optical image is projected on the photo cathode 3, electrons are emitted from the left side of the photo cathode 3 in quantities or numbers per unit area proportional to the light intensity of the image. Thus, close to the photo cathode 3, there is an electron image representative of the light image projected on photo cathode 3. The electrons making up this electron image are accelerated toward the mosaic electrode 5 and focused on it by the electron lens system 7. There is therefore projected on mosaic electrode 5 an image made up of high velocity electrons.

The mosaic electrode 5 is of such character that for every electron which strikes it, several secondary electrons are emitted. In this way, areas which are bombarded become positive with respect to the rest of the surface. An electron image is therefore produced on the mosaic electrode 5, which is like the optical image projected on the photo cathode.

There are advantages to be gained in projecting an electron image upon the mosaic electrode 5, rather than relying on photo emission to form the electron image directly. The response of the photo cathode may be improved by disregarding the shape of the spectral curve. It is possible to make a semi-transparent photo cathode which has a sensitivity between 20 and 50 micro-amperes per lumen. This is compared to the normal 15 micro-amperes per lumen where it is necessary to so construct the mosaic as to have a spectral response similar to that of the human eye. Furthermore, a strong field may be made to exist at the photo cathode which will saturate the emission. This is not practical except where the image section is employed. It is also possible, by employing an image section, as illustrated, to have a solid element photo cathode in place of the mosaic photo cathode. This permits an additional improvement factor of 10 over systems not employing the advantages offered by using electron optics to provide an electron image at the mosaic electrode 5. The output current available from the mosaic electrode 5 is also increased greatly by the storage action of the mosaic elements. The current charge resulting from the effect of the electron image on the mosaic element continues during substantially all the time of exposure. When energy is obtained from the mosaic, the total stored charge deficiency is suddenly released. Consequently, the current impulse from the electron image element is much greater than the instantaneous secondary emissive current caused by the electron image element bombardment.

Each elemental area of the mosaic electrode 5 is coupled to the external circuit through the electrical capacitance between the globule of the mosaic and the conducting element on the reverse side of the mosaic electrode 5. The capacitance becomes charged when the globule loses electrons under the influence of the electronic bombardment of electrons from the electrons, as referred to above. As the bombardment persists, the charge on the capacitance increases.

It will be seen, therefore, that the operation of the image storage tube 1 up to this point is similar to the operation of an image iconoscope whose operation is explained in detail in the article entitled "The Image Iconoscope," referred to above.

In the image iconoscope, the charges on the elemental capacitance areas of the target electrode are discharged through a narrow beam of electrons known as a scanning, which is directed over the surface of the mosaic in a predetermined scanning raster. In camera tubes, such as the image iconoscope and the like, the scanning beam is formed by an auxiliary electron gun. The electron scanning beam, upon contact with the elemental areas, suddenly replaces the lost charge on each globule, and the capacitance thereby becomes discharged through the plate at the rear, which is connected to a signal utilization circuit. The rapid discharge acting through the capacitance between the mosaic elements and the rear plate of the mosaic electrode appears as current impulses in a signal train. As the scanning beam moves across the mosaic electrode, the current impulses generated correspond in magnitude with the elemental intensity of the electron image present at the globule scanned.

It is necessary, therefore, to the proper operation of such a device that a scanning beam be provided. A scanning beam similar to that of the image iconoscope could be provided for the device illustrated, however, according to this invention, the scanning beam having its origin at the photo cathode and flowing to the mosaic electrode 5 results from the scanning raster projected on the photo cathode 3. This will be understood when it is appreciated that an auxiliary bright spot of light projected on the photo cathode 3 will provide an auxiliary electron stream from the photo cathode 3 to the mosaic electrode 5. The operation of the auxiliary electron beam caused by the scanning raster projected on the photo cathode 3, in effect, is similar to that provided by the use of an auxiliary electron gun to produce a signal train from a scanning of the mosaic electrode 5.

It will be seen, however, that the direction of impact of the electron beam on the mosaic electrode 5 will always be perpendicular, thus eliminating much of the undesirable shading which is present when the beam strikes the target electrode at an angle.

The scanning raster may, for example, be projected on the photo cathode 3 by the scanning raster producing tube 9 which may, for example, take the form of a kinescope or other image producing tube well known to the art and may be of the improved type shown and described in an article by D. W. Epstein and L. Pensak entitled "Improved Cathode-Ray Tubes with Metal-Backed Luminescent Screens" published in "RCA Review" for March, 1946.

The scanning raster produced on the screen 11 of the tube 9 is projected on the face of the photo cathode 3 by a partially reflective mirror 13 and a lens 15.

As has been outlined above, the transmission of images in substantially their natural color requires that the light of the images be broken down into selected component colors, and in the practice of one preferred form of this invention, this is accomplished by a ruled color filter 17 positioned adjacent screen 11 of the scanning raster producing tube 9.

Figure 2:
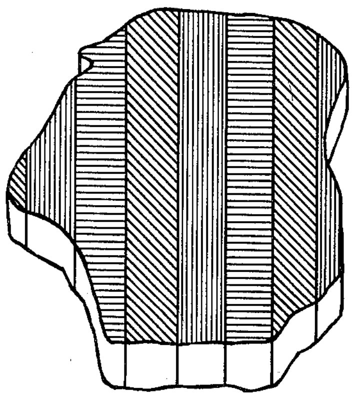
Figure 2 shows schematically a greatly enlarged portion of the ruled color filter employed in the form of the invention illustrated in Figure 1.

The ruled color filter 17 is shown in detail in Figure 2 and consists of a plurality of elemental component color filter areas positioned, for example, as illustrated in Figure 2, and each element being sufficiently small as to be indistinguishable from each other by the unaided human eye.

If the scanning line direction is adjusted to be substantially transverse to the long dimension of elemental sections shown, it will be seen that the scanning raster will consist of a multiple component color raster corresponding to the ruled color filter 17, and if the spot of the electron beam is sufficiently small in area, the instantaneous color of the light spot will be dependent upon the color filter element behind which it is at the time instance in question.

It is preferred that the size of the scanning spot, particularly along its horizontal direction, should not exceed the width of the component color filter element. If desired, the shape of the spot may be made elliptical.

By utilizing the partially reflective mirror 13, the scanning raster produced on the screen 11 is not only projected upon the photo cathode 3, but is also caused to fall upon several light sensitive devices 19, 21 and 23 which are made responsive to the selected component colors by the color filters 25, 27 and 29 and marked red, blue and green, respectively.

Light from the object in the form of an image is also projected on the photo cathode 3 by lens 15 and lens 31.

By employing a second ruled color filter 33 adjacent to and in front of the photo cathode 3, the image on photo cathode 3 of the object to be scanned is broken down into its selected component colors. If the ruled color filter 17 and the ruled color filter 33 are positioned in optical registry, it follows that the elemental image area of electrode 5 being scanned at the moment will have a charge representative of the selected component color light from the corresponding elemental area of the object and will be of the same selected component color as that element of the ruled color filter 17 which projects its light to the light sensitive devices 19, 21 and 23.

If, for example, a red sub-element of the scanning raster is being scanned at the moment, the light sensitive device 19 behind the red filter 25 will be responsive.

This will activate keyed wide band amplifier 35, which will pass the signal obtained from electrode 5 while keyed wide band amplifiers 37 and 39 are inactive. It will be seen, therefore, that the signal energy obtained during this interval results from the charge of sub-elemental area of the electron image projected on electrode 5 which, in turn, corresponds to the light intensity on the sub-elemental area of the image of the object which is behind the red element of the ruled color filter 33.

Likewise, when the scanning beam moves to the next adjacent sub-elemental area of the ruled color filter 33, which may, for example, be a blue element, the light responsive device 21 causes keyed wide band amplifier 37 to become responsive while amplifiers 35 and 39 are inactive. Likewise, when the scanning beam is at the position of the green element of the ruled color filters 17 and 33, only amplifier 39 is active to pass signals representative of the sub-elemental area of the green component color image of the object.

If the scanning spot is wider than the component color filter element, a certain amount of color dilution will result. This may be overcome by clipping and using only the peak of the control signals obtained from the light sensitive devices 19, 21 and 23.

Due to the fact that each of the amplifiers 35, 37 and 39 must pass signal impulses which are representative of a sub-element of the elemental area of the image of the object being scanned, it is necessary that amplifiers 35, 37 and 39 be capable of passing a frequency band several times that required for normal transmission of the elemental area or detail desired in the reproduced image. However, in the reproduction of the color image, it is only necessary to reproduce an area as small as the image elemental area. There are, therefore, provided integrators 41, 43 and 45 which are designed to so integrate the signal obtained from the wide band amplifiers 35, 37 and 39 that there will be produced in transmitters 47, 49 and 51 simultaneous signals representative of each of the selected component colors.

The keyed wide band amplifiers 35, 37 and 39 may take any of the well known forms capable of passing an extremely wide band such as, for example, the amplifier shown and described by G. C. Sziklai and A. C. Schroeder in an article entitled "Cathode-Coupled Wide-Band Amplifiers," beginning on page 701 of the "Proceedings of the Institute of Radio Engineers" for October, 1945. The amplifiers may be keyed in accordance with any of the well-known processes such as, for example, so biasing the tubes in the amplifier that they will be inactive during predetermined intervals of time which may be governed by the light responsive devices 19, 21 and 23. A keying circuit of one type is shown and described beginning on page 435 of the book "Television" by V. K. Zworykin and G. A. Morton.

The integrators shown in blocks 41, 43 and 45 may, for example, be a simple resistance and capacity circuit having proper elemental values. A typical integrator circuit is shown and described in detail beginning on page 162 of the book entitled "Principles of Television Engineering" by Donald G. Fink.

In view of the fact that any band pass amplifier having a narrower pass band than the incoming frequency range will integrate the signal, the integrators 41, 43 and 45 may be omitted and the pass band of transmitters 47, 49 and 51 so adjusted to provide the proper integration.

Figure 3:
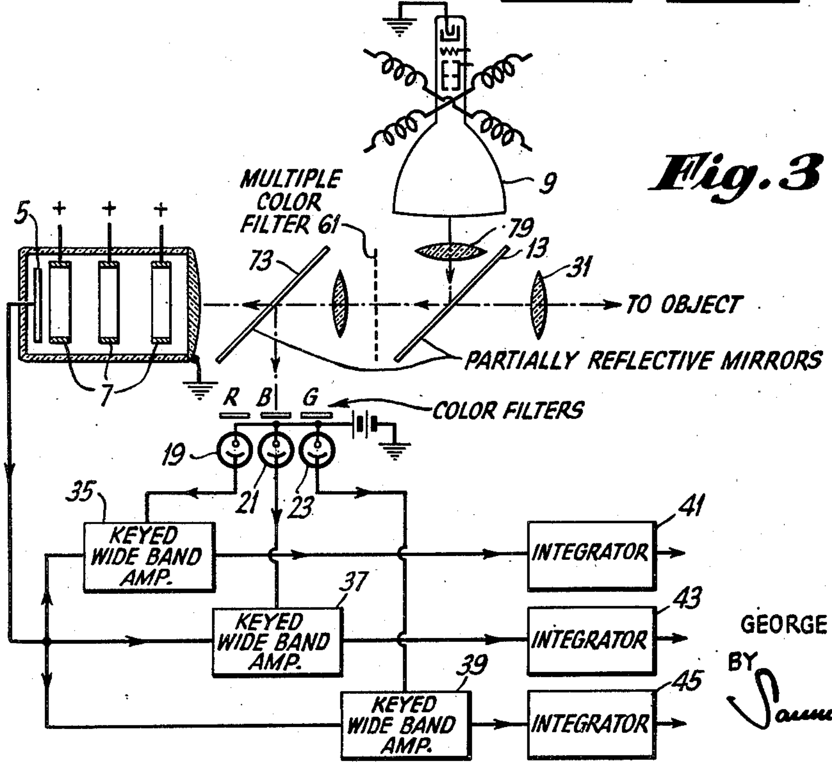
Figure 3 illustrates by block diagram another form of this invention.

Turning now to Figure 3, there is shown another preferred form of this invention wherein a single multiple color filter 61 (like 17 or 33 of Figure 1) is positioned optically between photo cathode 3 and the object. Multiple color filter 61 is also positioned optically between the scanning raster producing tube 9 and the light sensitive devices 19, 21 and 23. The multiple color filter 61 is also between the scanning raster producing tube 9 and the photo cathode 3.

The optical system, containing partially reflective mirrors 73 and 13, together with lenses 77, 79 and 31, is so arranged that an image of the scanning raster and the object is focused on the multiple color filter 61. An image of the multiple color filter 61 is then focused on the photo cathode 3. It will be seen, therefore, that the effect obtained and the operation of the device shown in Figure 3 is similar to that of the device shown in Figure 1. There will be focused on the photo cathode 3 an image of the object being scanned, which is broken down into very minute elemental areas of the selected component colors. When the scanning spot of the scanning raster is at a red sub-element position, the signal obtained from the mosaic electrode 5 of the image tube 1 will be representative of the selected component color light value of the elemental area of the object being scanned.

The operation of the amplifiers 35, 37 and 39 is similar to that described for amplifiers 35, 37 and 39 of Figure 1. During the time interval that a red sub-elemental area is being scanned, the light sensitive device 19, being positioned behind a red color filter, activates the keyed wide band amplifier 35 to pass the signal obtained from the mosaic electrode 5. Likewise, during the scanning of a blue sub-element, light sensitive device 21, which is positioned behind a blue filter, causes keyed wide band amplifier 37 to become active. During the time interval that the green sub-element is being scanned, light sensitive device 23 causes keyed wide band amplifier 39 to become active. The signals from each of the amplifiers 35, 37 and 39 are then passed to the integrators 41, 43 and 45, respectively, which correspond to like numbered components of Figure 1.

Although three transmitters 47, 49 and 51 were employed in the preferred form of the invention shown in Figure 1, the signals obtained from the integrators 41, 43 and 45 of Figure 2 may be utilized in any way desired, such as, for example, modulation of subcarriers to be combined and transmitted through a single radio channel, or it may be desired to sequentially transmit the signals.

It might also be added that all three signals may be combined to form a black and white system which, of course, will have the advantage that the color response of the system may be controlled by varying the gain individually in each of the amplifiers 35, 37 and 39. It will also be seen that the signal obtained from the target electrode 3 can be integrated and transmitted directly to provide for black and white transmission, if desired.

Figure 4:
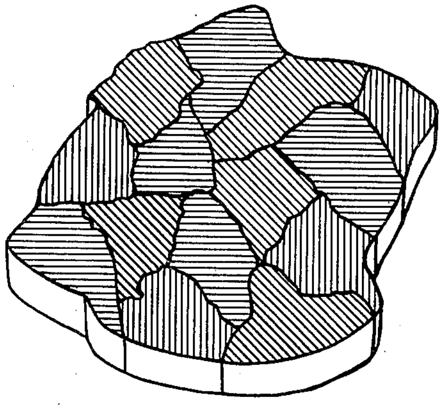
Figure 4 illustrates schematically a greatly enlarged portion of another type of multicolor filter suitable for employment in the practice of this invention.

Although the ruled color filter employed in Figure 1 should be of a structure which may be made to optically register with another ruled color filter of the same type, it will be seen that when optical registry of a plurality of ruled color filters is not required, such as for the form of the invention shown in Figure 3, the shape of the sub-elements may be irregular, as illustrated in Figure 4. The multiple color filter shown in Figure 4 is broken down, as illustrated, into subelemental areas of different selected component colors, such as, for example, red, blue and green. The effect of the multiple color filter shown in Figure 4 is the same as for the ruled color filter shown in Figure 2, and performs the same two functions of breaking down the image of the object into the selected component color sub-elements and providing the appropriate selected component color light for the light responsive devices resulting from the scanning raster which is projected thereon.

Figure 5:
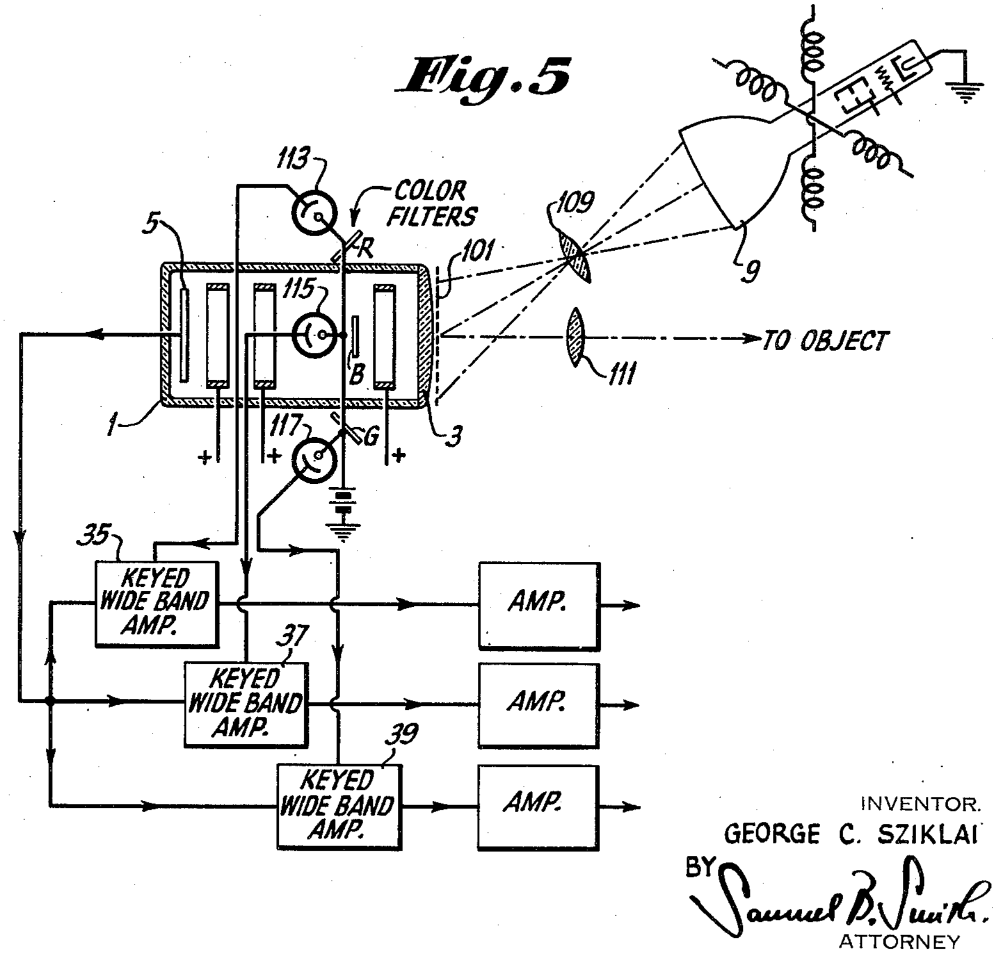
Figure 5 illustrates still another form of this invention.

Turning now to Figure 5, there is shown still another preferred form of this invention involving a simpler optical system wherein the multiple color filter 101 (like filter 17 of Figure 1, for instance) is positioned adjacent or is made part of the photo cathode 3 of the image storage tube 1.

A scanning raster producing tube 9 projects a scanning raster on the multiple color filter 101 through lens 109. An image of the object is focused on the multiple color raster 101 through lens 111.

The light sensitive devices 113, 115 and 117 (like elements 19, 21 and 23 of Figure 1, for instance) are positioned behind their respective red, blue and green color filters in such a manner as to obtain illumination from the rear of the multiple color filter 101 and may, for example, as illustrated, be positioned adjacent the sides of the tube 1.

The operation of the form of the invention illustrated in Figure 5 is generally the same as has been explained in detail above for the preferred forms of the invention shown in Figures 1 and 3.

The plane of the scanning raster may take a position parallel to the multiple element filter 101, thus eliminating the necessity of providing for keystone correction. An appropriate optical system may be provided.

It will become apparent from a study of the operation of this invention that the scanning raster producing device 9, the image storage tube 1, and even the photoelectric devices 113, 115 and 117, together with their associated color filters, may be contained in a single envelope with the photo cathode 3 and the target electrode 5.

It is generally accepted that electron lenses operate in a manner similar to optical lenses. Lenses have certain distortions which may be classed as five separate abberations, including spherical abberation, astigmatism, coma, curvature of the image field, and distortion of the image. A detailed explanation of these distortions may be found beginning on page 120 of the book entitled "Television" by V. K. Zworykin and G. A. Morton, published by John Wiley & Sons, Inc., in 1940, and referred to above.

In addition, there is a sixth distortion due to the variations in the initial velocities of the electrons as they leave the photo cathode. This is known as chromatic abberation because of its similarity to optical chromatic abberations caused by the variation of the index of refraction with the wave length of light.

It will be seen, however, that consideration and appropriate correction must be made for these abberations in a camera tube of the type of the image iconoscope or the image orthicon wherein an auxiliary device such as an electron gun is employed for the scanning operation.

It will be seen, however, that in the applicant's device the distortion of the image resulting from the above mentioned abberations will also be applied similarly to the scanning arrangement so that, regardless of the distortion of the image, a similar distortion will be applied to the scanning operation in such a manner that both distortions will cancel each other out to provide a signal train representative of an undistorted image.

Having thus described the invention, what is claimed is:

1. A television camera comprising in combination a photo cathode, a mosaic target electrode, an electron lens, said target electrode coupled to said photo cathode by said electron lens, said photo cathode having associated therewith a multiple element color filter comprising a plurality of different selected component color elements, an optical system to develop on said multiple element color filter a scanning raster and an image of the object to be scanned, a plurality of signal channels, each having a signal input circuit and a response control circuit, a connection between each of said input circuits and said image target electrodes, a plurality of light responsive devices positioned in optical association with said multiple color filter, and each responsive to lights of different of said selected component colors, one of said component color light responsive devices connected to each of said signal channels through its associated response control circuit to control the operation of said signal channels.

2. A television camera comprising in combination a photo cathode, a mosaic image target electrode, an electron lens, said target electrode electronically coupled to said photo cathode by said electron lens, said photo cathode having optically associated therewith a multiple element selected component color filter of planar form, an optical system to develop on said multiple element color filter an image of the object to be scanned, an electron scanning beam together with an associated optical arrangement to develop a scanning raster on said multiple element color filter, a plurality of signal channels, each having a signal input circuit and a response control circuit, each of said input circuits connected to said target electrode, a plurality of light responsive devices positioned in optical association with said multiple color filter and each responsive to lights of different of said selected component colors, one of said component color light responsive devices connected to each of said signal channels through its associated response control circuit to control the operation of said signal channels.

3. In a television system, a camera comprising in combination a scanning electron beam for forming a scanning raster, a photo cathode and an associated image target electrode, a multiple color filter comprising a plurality of different selected component color elements, an optical system to develop on said multiple color filter an image of said scanning raster and an image of an object to be scanned, a plurality of independent signal channels, each having a signal input circuit, each of said input circuits connected to said image target electrode, a plurality of light responsive devices, each responsive to different of the selected component colors and positioned in optical association with said multiple color filter, one of said component color light responsive devices connected to each of said signal channels to control the operation of said signal channels so that said signal channels pass signals only when its associated light responsive device is activated.

4. A television camera comprising in combination a photo cathode, an image storage target electrode, an electron lens, said electrode electronically coupled to said photo cathode by said electron lens, said photo cathode having associated therewith a multiple element color filter comprising a plurality of different selected component color elements, said elements of said multiple element color filter being sufficiently small that they are substantially invisible to the unaided human eye at normal viewing distance, an electron scanning beam to form a scanning raster, an optical system to develop on said multiple element color filter an image of said scanning raster and an image of the object to be scanned, a plurality of signal channels, each having a signal input circuit and a signal channel response control circuit, each of said input circuits connected to said image storage target electrode, a plurality of light responsive devices positioned in optical association with said multiple color filter to derive therethrough light from said scanning raster and each of said light responsive devices responsive to lights of different of the selected component colors and wherein one of said component color light responsive devices is connected to each of said signal channels through its associated response control circuit to control the passage of signals through said signal channels.

5. A television camera comprising in combination a photo cathode, an image mosaic target electrode, an electron lens, said electrode coupled to said photo cathode by said electron lens, said photo cathode having associated therewith a multiple element color filter comprising a plurality of different selected component color elements, each of said component color elements sufficiently small to be indistinguishable from the others by the unaided human eye, means to develop on said multiple element color filter a scanning raster and an image of the object to be scanned, a plurality of signal channels, each having a signal input circuit and a signal channel response control circuit, each of said input circuits connected to said image storage target electrode, a plurality of light responsive devices positioned in optical association with said multiple color filter to derive therethrough light from said scanning raster and each responsive to lights of different of the selected component colors and wherein one of said component color light responsive devices is connected to each of said signal channels through its associated response control circuit to control the operation of said signal channels.

6. A television camera comprising in combination means for forming a scanning raster, an image storage tube having a photo cathode and a secondary emissive storage electrode, a multiple color filter comprising a plurality of different selected component color elements positioned optically between said means for forming a scanning raster and said photo cathode and also positioned optically between the position of an object to be scanned and said photo cathode, a plurality of independent signal channels, each having a signal input circuit, each of said input circuits connected to said secondary emissive storage electrode, a plurality of component color light responsive devices, said multiple color filter positioned optically between said means for forming a scanning raster and each of said component color light responsive devices, one different of said component color light responsive devices connected to each of said signal channels to control the operation of said signal channels such that signals are passed only when light falls on its associated light responsive device and wherein the component colors to which said light responsive devices are responsive correspond substantially to the component colors of the elements of said multiple color filter.

7. A television camera comprising in combination means for forming a scanning raster on a multiple color filter comprising a plurality of different selected component color elements, an image storage tube having a photo cathode and an emissive storage electrode, an optical system to develop on said multiple color filter an image of an object to be scanned, a plurality of independent video signal channels, each having a signal input circuit, each of said input circuits connected to said emissive storage electrode, and a plurality of component color light responsive devices positioned in optical association with said multiple color filter, one of said component color light responsive devices connected to each of said signal channels to control the operation of said signal channels and wherein the component colors to which said light responsive devices are responsive correspond substantially to the component colors of the elements of said multiple color filter.

8. A television camera comprising in combination means for forming a scanning raster, a photo cathode, an electron lens, a storage electrode, a multiple color filter comprising a plurality of different selected component color elements, an optical system to project said scanning raster on said multiple color filter, another optical system to project on said photo cathode the image of said scanning raster and an image of an object to be scanned, a plurality of independent signal channels, each having a signal input circuit, each of said input circuits connected to said storage electrode, and a plurality of component color light responsive devices positioned in optical association with said multiple color filter, one of said component color light responsive devices connected to each of said signal channels to control the on and off operation of said signal channels and wherein the component color to which any of said light responsive devices are responsive corresponds substantially to a component color of an element of said multiple color filter.

9. A television camera comprising a multiple color filter having a plurality of different selected component color elements, means for forming a scanning raster on said multiple color filter, an image storage tube having a photo cathode and a target electrode, an optical system to project an image of said multiple color filter and an image of an object to be scanned on said photo cathode, a plurality of independent image signal channels, each having a signal input circuit, each of said input circuits connected to said target electrode, a plurality of light responsive devices, each responsive to one only of the selected component colors. means to project light from said multiple color filter on said component color light responsive devices, one of said component color light responsive devices connected to each of said signal channels to control the operation of said signal channels.

10. A television camera having a multiple color filter comprising a plurality of different selected component color strip elements, means for forming a scanning raster on said multiple color filter, the direction of the scanning being substantially perpendicular to said strips, an image storage tube having a photo cathode and a target electrode, an optical system to project an image of said multiple color filter and an image of an object to be scanned on said photo cathode, a plurality of independent signal channels, each having a signal input circuit, each of said input circuits connected to said target electrode, a plurality of light responsive devices, each responsive to one of the selected component colors, means to project light from said multiple color filter resulting from said scanning raster on said component color light responsive devices, one of said component color light responsive devices connected to each of said signal channels to control the operation of said signal channels.

11. A television camera comprising a plurality of multiple color filters, each having a plurality of different component color elements, means for forming a scanning raster on one of said multiple color filters, an image storage tube having a photo cathode and a target electrode, another of said multiple color filters positioned adjacent said photo cathode and in optical registry with the other of said multiple color filters, a plurality of independent signal channels, each having a signal input circuit, each of said input circuits connected to said target electrode, a plurality of light responsive devices positioned to receive light from the multiple color filter upon which a scanning raster is formed, each light responsive device responsive to one only of the selected component colors, one of said component color light responsive devices connected to each of said signal channels to control the operation of said signal channels to permit passage of signals only when activated.

12. A television camera comprising a multiple color filter having a plurality of different selected component color elements, an image tube having a photo cathode and a mosaic storage target electrode, means for forming a scanning raster on said multiple color filter, a plurality of independent signal channels, each having a signal input circuit, each of said input circuits connected to said target electrode, a plurality of light responsive devices, each responsive to one of the selected component colors, one of said component color light responsive devices connected to each of said signal channels to control the operation of said signal channels, an optical system to project an image of an object to be scanned on said multiple color filter, and means to transfer the light from said multiple color filter resulting from said image of said scanning raster to said photo cathode and means to transfer light from said multiple color filter to said component color light responsive devices.

13. A television camera comprising an image storage tube having a photo cathode and a target electrode, a multiple color filter comprising a plurality of different selected component color elements positioned adjacent to said photo cathode, means for forming a scanning raster on said multiple color filter, an optical system to develop on said multiple color filter an image of an object to be scanned, a plurality of normally inoperative independent signal channels, each having a signal input circuit, each of said input circuits connected to said light sensitive electrode, a plurality of light responsive devices positioned in optical association with said multiple color filter to obtain light therethrough from the scanning raster, each of said light responsive devices responsive to one only of the selected component colors, one of said component color light responsive devices connected to each of said signal channels to permit the passage of image signals through said signal channels.

14. A television camera comprising an image storage tube having a photo cathode and an image target electrode, said photo cathode having as a part thereof a multiple color filter comprising a plurality of different selected component color elements, an electron scanning beam for forming a scanning raster, an optical system to develop on said multiple color filter an image of said scanning raster and an image of an object to be scanned, a plurality of independent signal channels, each having a signal input circuit, each of said input circuits connected to said light sensitive electrode, a plurality of light responsive devices responsive to one of the selected component colors and each positioned in optical association with said multiple color filter to obtain light therethrough from the scanning raster, one of said component color light responsive devices connected to each of said signal channels to control the operation of said signal channels.

15. In a television camera, an image storage device having a photo cathode and a target electrode, a ruled color filter comprising a plurality of different selected component color elements, an electron beam scanning tube for forming a scanning raster, an optical system to develop on said multiple color filter an image of said scanning raster and an image of an object to be scanned, means for transferring an image from said photo cathode to said target electrode in toto, a plurality of independent signal channels, each having a signal input circuit, each of said input circuits connected to said light sensitive electrode, a plurality of light responsive devices and each responsive to one only of the selected component colors, one of said component color light responsive devices connected to each of said signal channels to control the operation of said signal channels.

16. In a television camera, an image storage device having a photo cathode and a target electrode, a multiple color filter comprising a plurality of randomly positioned different selected component color elements, a scanning ray tube for forming a scanning raster, an optical system to develop on said multiple color filter an image of said scanning raster and an image of an object to be scanned, electrical means to transfer in full and simultaneously said developed image and said scanning raster from said photo cathode to said target electrode, a plurality of independent signal channels, each having a signal input circuit, each of said input circuits connected to said light sensitive electrode, a plurality of light responsive devices, each responsive to one of the selected component colors and each positioned in optical association with said multiple color filter and wherein one of said component color light responsive devices is connected to each of said signal channels to control the operation of said signal channels.

17. A color television camera comprising in combination an image storage device having a photo cathode and a target electrode, a multiple color filter comprising a plurality of randomly positioned irregularly shaped and different selected component color elements, an electron ray beam for forming a scanning raster, an optical system to develop on said multiple color filter an image of said scanning raster and an image of an object to be scanned, a plurality of independent signal channels, each having a signal input circuit, each of said input circuits connected to said light sensitive electrode, a plurality of light responsive devices positioned in optical association with said multiple color filter, each responsive to one only of the selected component colors, and wherein one of said component color light responsive devices is connected to each of said signal channels to control the operation of said signal channels.

GEORGE C. SZIKLAI.

REFERENCES CITED

The following references are of record in the file of this patent:

UNITED STATES PATENTS

| Number | Name | Date |
|---|---|---|
| 2,239,769 | Batchelor | Apr. 29, 1941 |
| 2,256,300 | Van Mierlo | Sept. 16, 1941 |
| 2,260,709 | Gray | Oct. 28, 1941 |
| 2,280,191 | Hergenrother | Apr. 21, 1942 |
| 2,296,908 | Crosby | Sept. 29, 1942 |
| 2,310,863 | Leverenz | Feb. 9, 1943 |
| 2,333,969 | Alexanderson | Nov. 9, 1943 |
| 2,406,760 | Goldsmark | Sept. 3, 1946 |
| 2,415,059 | Zworykin | Jan. 28, 1947 |
| 2,423,770 | Goldsmith | July 8, 1947 |